United States Patent
Jang et al.

(10) Patent No.: US 12,261,301 B2
(45) Date of Patent: Mar. 25, 2025

(54) MANUFACTURING METHOD FOR ELECTRODE BINDER AND ELECTRODE ASSEMBLY COMPRISING SAME ELECTRODE BINDER

(71) Applicant: LG ENERGY SOLUTION, LTD., Seoul (KR)

(72) Inventors: Seong Keun Jang, Daejeon (KR); Woo Ha Kim, Daejeon (KR); Sang Hoon Choy, Daejeon (KR); In Seong Kim, Daejeon (KR); Sung Pil Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 703 days.

(21) Appl. No.: 17/600,492

(22) PCT Filed: Jul. 3, 2020

(86) PCT No.: PCT/KR2020/008726
§ 371 (c)(1),
(2) Date: Sep. 30, 2021

(87) PCT Pub. No.: WO2021/010629
PCT Pub. Date: Jan. 21, 2021

(65) Prior Publication Data
US 2022/0173402 A1 Jun. 2, 2022

(30) Foreign Application Priority Data

Jul. 15, 2019 (KR) .................. 10-2019-0085287

(51) Int. Cl.
*H01M 4/60* (2006.01)
*H01B 1/20* (2006.01)
(Continued)

(52) U.S. Cl.
CPC .............. *H01M 4/623* (2013.01); *H01B 1/20* (2013.01); *H01M 2004/021* (2013.01)

(58) Field of Classification Search
CPC .. H01B 1/22; H01B 1/24; H01M 4/08; H01M 4/623
See application file for complete search history.

(56) References Cited

U.S. PATENT DOCUMENTS 7,807,088 B2 * 10/2010 Ikeda .................. B29C 45/0001
264/328.17
8,722,791 B2 * 5/2014 Saito ..................... H01L 31/049
524/520

(Continued)

FOREIGN PATENT DOCUMENTS

| CN | 1674321 A | 9/2005 |
|---|---|---|
| CN | 102306754 A | 1/2012 |

(Continued)

OTHER PUBLICATIONS

Majima et al "Development of 1 KW h class lithium ion battery for power storage", Journal of Power Sources 92 (2001) 108-119.*

(Continued)

*Primary Examiner* — Mark Kopec
(74) *Attorney, Agent, or Firm* — MORGAN, LEWIS & BOCKIUS LLP

(57) ABSTRACT

The present technology relates to a manufacturing method for an electrode binder, comprising a step of dissolving pelletized polyvinylidene fluoride (PVDF) in a solvent; and an electrode assembly comprising the electrode binder. The present invention may provide an electrode assembly which has a low content of impurities in a binder solution, is capable of increasing dispersibility of an electrode active material, and exhibits excellent binding force.

14 Claims, 4 Drawing Sheets

(51) Int. Cl.
*H01M 4/62* (2006.01)
*H01M 4/02* (2006.01)

(56) References Cited

U.S. PATENT DOCUMENTS

| | | | |
|---|---|---|---|
| 2005/0285080 | A1 | 12/2005 | Suzuki et al. |
| 2011/0287315 | A1 | 11/2011 | Choy et al. |
| 2012/0213915 | A1 | 8/2012 | Igarashi et al. |
| 2013/0054061 | A1 | 2/2013 | Nishimoto |
| 2016/0289439 | A1 | 10/2016 | Nagasawa et al. |
| 2018/0056247 | A1* | 3/2018 | Kosar ............ C08F 14/18 |
| 2019/0088933 | A1 | 3/2019 | Maurer et al. |

FOREIGN PATENT DOCUMENTS

| | | |
|---|---|---|
| CN | 102597069 A | 7/2012 |
| CN | 105723549 A | 6/2016 |
| CN | 110536791 A | 12/2019 |
| EP | 3 851 490 A1 | 7/2021 |
| JP | 2004-71518 A | 3/2004 |
| JP | 2011177614 A | 9/2011 |
| JP | 5580590 B1 | 8/2014 |
| JP | 2015-500352 A | 1/2015 |
| JP | 2017-208207 A | 11/2017 |
| KR | 10-1994-0002534 B1 | 3/1993 |
| KR | 10-0660144 B1 | 12/2006 |
| KR | 10-2010-0006409 A | 1/2010 |
| KR | 10-2013-0015967 A | 2/2013 |
| KR | 10-2013-0103946 A | 9/2013 |
| KR | 10-2015-0120803 A | 10/2015 |
| KR | 10-2016-0040019 A | 4/2016 |
| KR | 10-2016-0094986 A | 8/2016 |
| KR | 10-2016-0129762 A | 11/2016 |
| KR | 10-2017-0024574 A | 3/2017 |
| KR | 10-1801543 B1 | 11/2017 |
| KR | 10-2018-0049401 A | 5/2018 |
| KR | 10-2018-0108950 A | 10/2018 |
| KR | 10-2019-0051354 A | 5/2019 |

OTHER PUBLICATIONS

International Search Report (with partial translation) and Written Opinion dated Nov. 16, 2020 issued in corresponding International Patent Application No. PCT/KR2020/008726, (Form 237 non-English language).
Office action issued Sep. 16, 2023, by the Chinese Patent Office in corresponding Chinese Patent Application No. 202080030296.5.
Office Action issued in Chinese Patent Application 202080030296.5 dated Jun. 4, 2024, (No English language translation provided).
Wikipedia, "Granular material," pp. 1-10, edited on Feb. 3, 2022.
"A Basic Guide to Particle Characterization" Malvern Instruments Worldwide, White Paper (2012).
Li et al., "Comparison of Particle Size Distributions Measured Using Different Techniques," An International Journal vol. 23, issue 3, pp. 265-284 (2005).
Thomas Dent Applications Scientist Agilent Technologies, "GPC/SEC Practical Tips and Tricks" Oct. 2011 Gulf Coast Conference.
Ghosh, "Polymer Science Fundamentals of Polymer Science, Molecular Weights of Polymers,".
Trunschke, "Surface area and pore size determination," Modern Methods in Heterogeneous Catalysis Research (2013).
Pastorino et al., "Multiple characterization study on porosity and pore structure of calcium phosphate cements," Acta Biomaterialia, vol. 28, pp. 205-214 (2015).
Valli, "A review of adhesion test methods for thin hard coatings," Journal of Vacuum Science & Technology A, vol. 4, No. 6, pp. 3007-3014 (1986).
Extended European Search Report dated Jul. 14, 2022 issued in corresponding European Patent Application No. 20840407.9.

* cited by examiner

[FIG. 1]

[FIG. 2]

[FIG. 3]
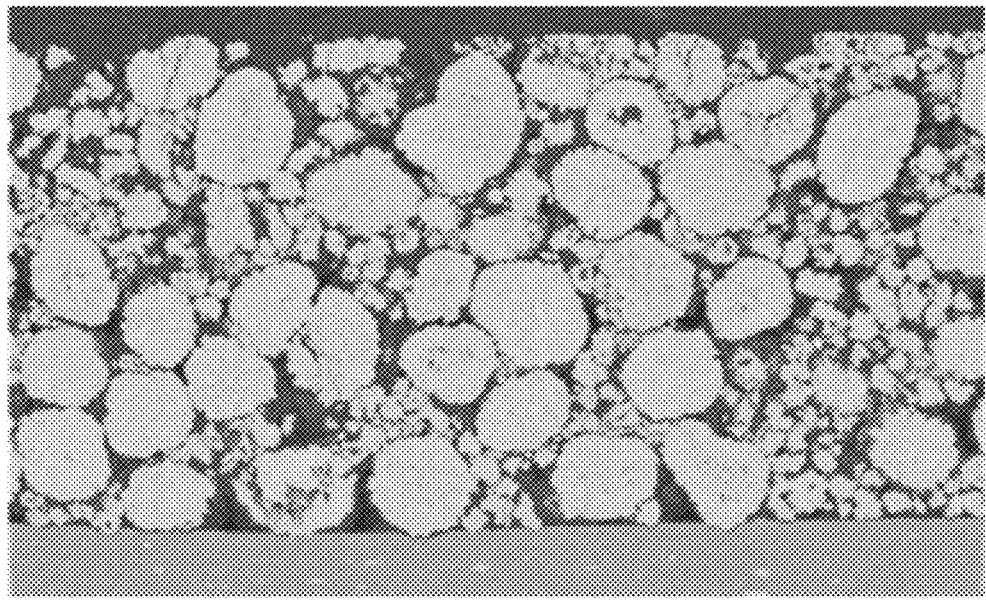
[FIG. 4]
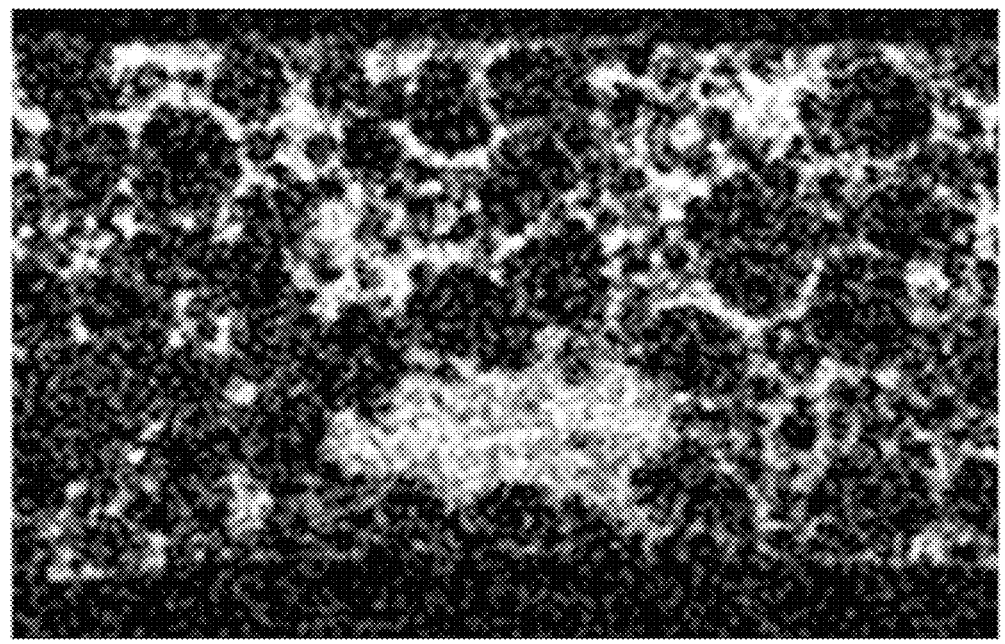

[FIG. 5]
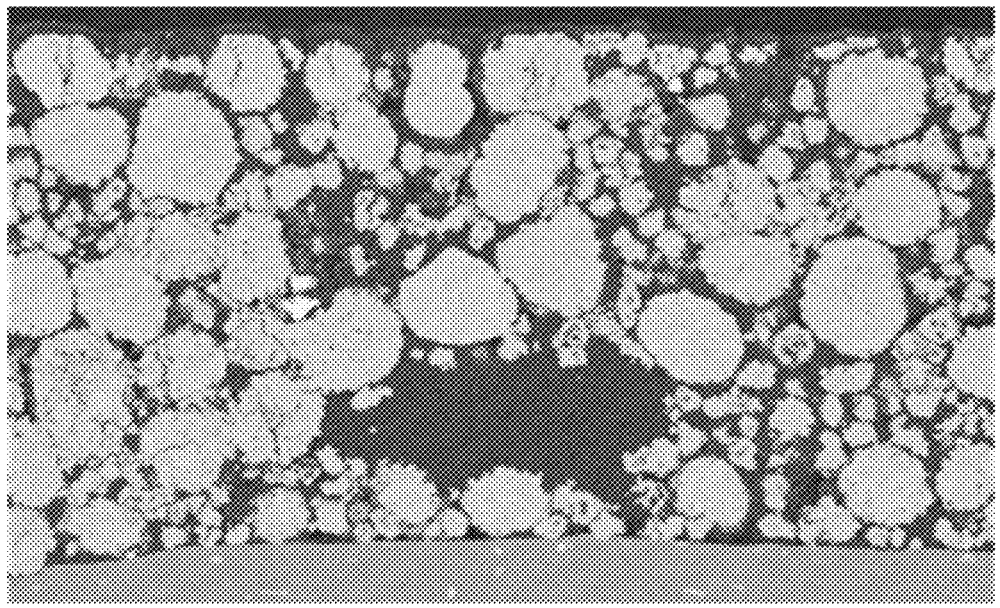
[FIG. 6]
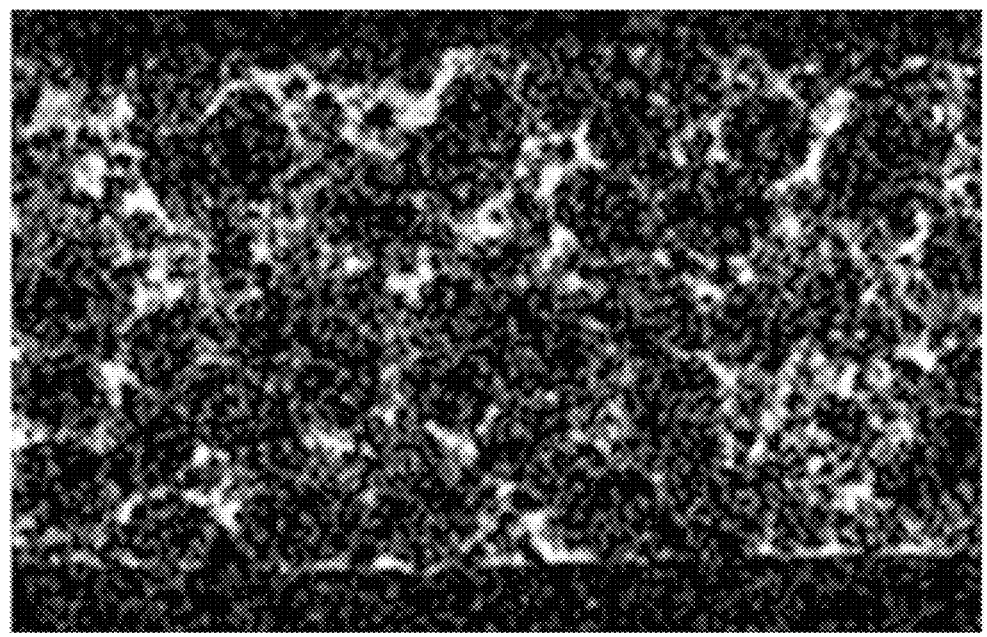

MANUFACTURING METHOD FOR ELECTRODE BINDER AND ELECTRODE ASSEMBLY COMPRISING SAME ELECTRODE BINDER

TECHNICAL FIELD

The present invention relates to a method of manufacturing an electrode binder and an electrode composite including the binder prepared by the method.

This application claims the benefit of priority based on Korean Patent Application No. 10-2019-0085287, filed on Jul. 15, 2019, and the entire contents of the Korean patent application are incorporated herein by reference.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

As the application fields and products of secondary batteries are diversified as described above, the types of batteries are also diversified to provide appropriate output and capacity. In addition, batteries applied to the field and products are strongly required to be miniaturized or lightweight.

The secondary battery includes a structure in which a separator is placed between both electrodes including a positive electrode and a negative electrode. The electrode has a structure in which a composite layer in which an active material is dispersed in a binder matrix is coated on an electrode current collector.

In order to simultaneously achieve the high output and miniaturization required in a secondary battery, a technology of evenly dispersing the active material on the electrode current collector is required while the battery is thinned. In addition, it is also required to improve the adhesion of the binder to improve the safety of the secondary battery.

DISCLOSURE

Technical Problem

The present invention was prepared to solve the above problems, and an object of the present invention is to provide a method of manufacturing an electrode binder containing polyvinylidene fluoride (PVDF) and an electrode composite including the same.

Technical Solution

A method for manufacturing an electrode binder according to the present invention includes a step of dissolving granulated polyvinylidene fluoride (PVDF) in a solvent.

According to an embodiment of the present invention, the granulated polyvinylidene fluoride (PVDF) is in a form of granulated powdery particles, and an average diameter of the granulated powdery particles is in a range between 0.5 and 5 mm.

According to an embodiment of the present invention, a ratio of lengths of a long axis to a short axis of the granulated powdery particles is in a range between 20:1 and 1:1.

According to an embodiment of the present invention, the granulated powdery particles include: at least one of first powder particles having a weight average molecular weight (Mw) of $2.0 \times 10^5$ to $7.5 \times 10^5$; or second powder particles having a weight average molecular weight (Mw) of $7.5 \times 10^6$ to $2.5 \times 10^6$.

According to an embodiment of the present invention, the solvent comprises a water-soluble solvent having a polar group.

Specifically, the solvent comprises at least one selected from the group consisting of acetone, tetrahydrofuran, methylene chloride, chloroform, dimethylformamide, N-methyl-2-pyrrolidone (NMP), cyclohexane, and water.

According to an embodiment of the present invention, wherein a content of the granulated polyvinylidene fluoride (PVDF) dissolved in a solvent is in a range between 1 and 25% (w/w) with respect to a total weight of the solvent including the granulated polyvinylidene fluoride (PVDF).

According to an embodiment of the present invention, the present invention may further include adding a conductive material after the dissolving granulated polyvinylidene fluoride (PVDF) in the solvent.

The present invention may also provide an electrode composite including an electrode binder.

According to an embodiment of the present invention, the electrode composite of the present invention comprises an electrode current collector; and an electrode composite layer coated on one side or both sides of the electrode current collector, wherein the electrode composite layer includes active material particles; a binder including polyvinylidene fluoride (PVDF); and a conductive material, the electrode composite layer includes pores in space between the active material particles, and the pores are filled with the binders and the conductive material, the pores have a porosity of 15 to 35% (v/v), and an average diameter of the pores is 0.01 to 1 mm.

According to an embodiment of the present invention, the active material particles include: first particles having an average particle diameter of 5 to 10 μm; and second particles having an average particle diameter of 100 to 200 μm based on a cross section of the electrode composite layer, and an area ratio of the first particles to the second particles is in a range between 1:1 and 10:1.

According to an embodiment of the present invention, a coating film having an average thickness of 50 to 150 μm is disposed on the electrode composite layer, and for specimens 2 cm wide and 20 cm long, adhesive force between the electrode current collector layer and the electrode composite layer is 100 N/m or more.

Advantageous Effects

The method of manufacturing an electrode binder according to the present invention can provide an electrode composite having low impurity content in a solution, a high dispersion degree of an electrode active material, a binder, and a conductive material, and excellent adhesive force.

BRIEF DESCRIPTION OF THE DRAWINGS

FIG. 1 is a photograph of a binder solution after the binder solution, in which a stirring process has been completed according to an embodiment of the present invention, is filtered through a 200 mesh filter.

FIG. 2 is a photograph of a binder solution after the binder solution, in which a stirring process has been completed according to a comparative example of the present invention, is filtered through a 200 mesh filter.

FIGS. 3 and 4 show results of observing a cross section of an electrode composite according to an embodiment of the present invention.

FIGS. 5 and 6 show results of observing a cross section of an electrode composite according to a comparative example.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a polyvinylidene fluoride (PVDF)-based electrode binder and a method of manufacturing the same. Specifically, the electrode binder according to the present invention is prepared by dissolving granulated polyvinylidene fluoride in a solvent.

Polyvinylidene fluoride is used as an electrode binder for secondary batteries, but there is a problem that solubility in a solvent is poor. The decrease in solubility in the solvent increases the impurity content of the binder component and acts as a cause of inhibiting the uniform dispersion of the active material when mixed with the active material. Specifically, polyvinylidene fluoride in powder form has a problem in that the dissolution rate is slow because the bulk density is small and the solvent wettability is poor. In addition, a significant amount of the added polyvinylidene fluoride floats in the upper layer of the solvent and hardly receives shear stress applied to the solvent during stirring.

In the present invention, the powdered polyvinylidene fluoride is granulated and dissolved in a solvent, thereby enhancing dissolution and dispersibility in the solvent. The granulated polyvinylidene fluoride is in a form in which powdered particles are aggregated and granulated. The average diameter of the granulated powdery particles can be controlled in the range of 0.5 to 5 mm. Specifically, the average diameter of the granulated powdery particles is in the range of 0.5 to 4 mm, 0.5 to 2.5 mm, 1 to 3.5 mm, 2 to 4.5 mm, 3.5 to 5 mm, or 1 to 3 mm. By controlling the average diameter of the granulated powdery particles in the above range, it provides a sufficient bulk density and prevents the formation of floating matters. When the average diameter of the granulated powdery particles is excessive, the surface area relative to the weight decreases, so that solubility may decrease.

In another example, the present invention includes a case where two or more groups of granulated powdery particles having different average particle diameters are mixed and used. For example, the granulated powdery particles may include a first group of granulated powdery particles having an average diameter of 0.5 to 2.5 mm; and a second group of granulated powdery particles having an average diameter in the range of 3.5 to 5 mm. The first granule group and the second granule group may be used in a mixing ratio of 1:1 to 10:1. By mixing and using groups of granulated powdery particles having different particle diameters, there is an effect of increasing dispersibility and solubility in preparing a binder and reducing the occurrence of air bubbles.

In one embodiment, the shape of the granulated powdery particles is a cylinder, a rectangular parallelepiped, or a spherical shape having an ellipse in cross section. In addition, the granulated powdery particles are in a form in which the ratio of the length of the long axis and the short axis is in the range of 20:1 to 1:1. Specifically, the ratio of the length of the long axis and the short axis of the granulated powdery particles is in the range of 17:1 to 3:1, 15:1 to 5:1, or 13:1 to 7:1. By forming the granulated powdery particles in a form extending in one direction, it is possible to increase the surface area to weight while securing bulk density.

The granulated powdery particles are in the form of agglomerated powdery particles. The powdery particles can be controlled within a range that provides a sufficient surface area while forming granulated powdery particles. For example, the powdery particles may include one or more among first powder particles having a weight average molecular weight (Mw) of $2.0 \times 10^5$ to $7.5 \times 10^5$; and second powder particles having a weight average molecular weight (Mw) of $7.5 \times 10^5$ to $2.5 \times 10^6$. First or second powder particles, or a mixture of both particles may be used as the powdery particles. More specifically, the weight average molecular weight of the first powder particles is in the range of $2.5 \times 10^5$ to $7.0 \times 10^5$, $3.0 \times 10^5$ to $6.5 \times 10^5$, or $3.5 \times 10^5$ to $6.0 \times 10^5$. In addition, the weight average molecular weight of the second powder particles is more specifically in the range of $1.0 \times 10^6$ to $2.2 \times 10^6$, $1.2 \times 10^6$ to $2.0 \times 10^6$, or $1.4 \times 10^6$ to $1.8 \times 10^6$. The inventors of the present invention confirmed that, through various and repeated experiments, by controlling the weight average molecular weight of the powdery particles within the above range, the formulation stability of the granulated powdery particles can be improved without impairing the wettability to the solvent.

In one example, the present invention agglomerates powdery particles to form granulated powdery particles. In this case, powder particles having different weight average molecular weights may be used, but granulated powdery particles having different particle diameters may be formed for each powder particle. For example, the second granule group described above may be formed by using the above first powder particles, and the first granule group may be formed by using the second powder particles. Through this, it is possible to maintain the bulk density of the prepared granulated powdery particles and to increase the solubility in a solvent. In another example, it is also possible to form the first granule group described above by using the above first powder particles, and to form the second granule group by using the second powder particles.

The present invention provides a method of preparing a polyvinylidene fluoride-based binder. Examples of polyvinylidene fluoride include one or more among polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene and polyvinylidene fluoride-co-ethylene.

The polyvinylidene fluoride binder may be used alone or in combination with an acrylic binder. In the case of such a combination, the advantageous properties of the acrylic binder may be utilized according to the combination ratio.

The acrylic binder may be a copolymer including: at least one first functional group selected from the group consisting of —OH groups and —COOH groups; and at least one second functional group selected from the group consisting of an amine group and an amide group.

Specifically, the acrylic binder may have a repeating unit derived from a monomer having a first functional group and a repeating unit derived from a monomer having a second functional group. Such an acrylic binder, together with a polyvinylidene fluoride-based binder, can form a uniform electrode composite layer on the electrode, and can prevent layer separation and provide electrochemical performance and stability.

The solvent used in the present invention can be applied without limitation as long as polyvinylidene fluoride can be sufficiently dissolved. Specifically, the solvent is a water-soluble solvent having a polar group.

Non-limiting examples of the solvent include acetone, tetrahydrofuran, methylene chloride, chloroform, dimethylformamide, N-methyl-2-pyrrolidone (NMP), cyclohexane, water, or a mixture thereof. Specifically, the solvent may be N-methyl-2-pyrrolidone (NMP). Such a solvent has excellent solubility of polyvinylidene fluoride and provides an appropriate level of viscosity so that a slurry coating layer can be formed at a desired level on the surface of the electrode current collector.

An appropriate amount of granulated polyvinylidene fluoride is added to the solvent. Specifically, the content of polyvinylidene fluoride dissolved in the solvent is in the range of 1 to 25% (w/w). By controlling the content of polyvinylidene fluoride within the above range, it is possible to achieve an appropriate level of viscosity and minimize the occurrence of suspended matter.

In one embodiment, the present invention further includes a step of adding a conductive material in or after the step of dissolving granulated polyvinylidene fluoride (PVDF) in a solvent. Such a conductive material is not particularly limited as long as it has high electrical conductivity without causing a chemical change in a battery, and examples thereof include graphite such as natural graphite and artificial graphite; carbon black such as carbon black, acetylene black, Ketjen black, channel black, furnace black, lamp black, and thermal black; conductive fibers such as carbon fiber and metal fiber; carbon fluoride; metal powders such as aluminum and nickel powder; conductive whiskey such as zinc oxide and potassium titanate; conductive oxides such as titanium oxide; and conductive materials such as polyphenylene derivatives and the like.

The present invention also provides an electrode composite including a binder prepared by the method described above. In the present specification, the term "electrode composite" is understood to refer to a structure in which a composite layer of an active material, a binder, and a conductive material is formed on an electrode current collector.

The electrode composite of the present invention includes an electrode current collector; and an electrode composite layer coated on one or both surfaces of the electrode current collector. Herein, the electrode composite layer includes: a particulate active material; and polyvinylidene fluoride (PVDF) and a conductive material. In one embodiment, the electrode composite layer is filled with particulate active materials, and voids between the active material particles are filled with binders and conductive materials.

The voids have a porosity of 15 to 35% (v/v), and the average diameter of the voids is 0.01 to 1 mm. More specifically, the porosity is 20 to 30% (v/v), and the average diameter of the voids is 0.1 to 0.5 mm. In the present invention, by controlling the porosity of the voids and the average diameter of the voids as described above, the particulate active material, the binder, and the conductive material can be uniformly dispersed in the electrode composite layer.

The particulate active material may include particles having different particle diameters based on the cross section of the electrode composite layer. Specifically, the particulate active material may include first particles having an average particle diameter of 5 to 10 μm; and second particles having an average particle diameter of 100 to 200 μm. In the present invention, the case where particulate active materials having a uniform particle diameter are dispersed in the electrode composite layer is not excluded. However, by mixing the first and second particles having different particle diameters, the porosity in the electrode composite layer can be reduced and the dispersion density of the active material can be increased. In addition, when the first and second particles are mixed, the area ratio occupied by the first and second particles can be controlled in the range of 1:1 to 10:1. This is the ratio of the area occupied by each particle based on the cross-section of the electrode composite layer.

In addition, the electrode composite according to the present invention provides excellent adhesive force between the electrode current collector layer and the electrode composite layer. For example, under the condition that the coating film thickness of the electrode composite layer is 50 to 150 μm, the adhesive force between the electrode current collector layer and the electrode composite layer is 100 N/m or more. Specifically, the adhesive force is in the range of 110 to 150 N/m, or 115 to 125 N/m.

In one embodiment, the electrode active material (i.e., positive electrode active material and negative electrode active material) and the electrode current collector (i.e., positive electrode current collector and negative electrode current collector) of the present invention are not particularly limited, and these can be prepared according to a conventional method known in the art or a modified method thereof.

The positive electrode active material may include a compound, which uses a lithiumintercalation material as its main component, such as a layered compound such as lithium cobalt oxide ($LiCoO_2$), lithium nickel oxide ($LiNiO_2$), or a compound substituted with one or more kinds of transition metals; lithium manganese oxides such as $Li_{1+x}Mn_{2-x}O_4$ (herein, x is between 0 and 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein, M=Co, Mn, Al, Cu, Fe, Mg, B or Ga, and x=0.01 to 0.3); lithium manganese composite oxide expressed by $LiMn_{2-x}M_xO_2$ (herein, M=Co, Ni, Fe, Cr, Zn or Ta, and x=0.01 to 0.1) or $Li_2Mn_3MO_8$ (herein, M=Fe, Co, Ni, Cu or Zn); $LiMn_2O_4$ in which a part of Li in the formula is substituted with an alkaline earth metal ion; disulfide compound; and $Fe_2(MoO_4)_3$ or a compound oxide formed by combination thereof, but not limited thereto. The positive electrode current collector may have a thickness of 3 to 500 micrometers.

The positive electrode current collector is not particularly limited as long as it has conductivity without causing a chemical change in a battery. Examples of the positive electrode current collector include stainless steel, aluminum, nickel, titanium, sintered carbon or aluminum or stainless steel of which the surface has been treated with carbon, nickel, titanium, silver, or the like. The electrode current collector may have fine irregularities on the surface thereof to increase the adhesion of the positive electrode composite, and various forms such as a film, a sheet, a foil, a net, a porous body, a foam, and a nonwoven fabric are possible.

The binder is a component that assists in bonding of positive electrode active material particles and conductive material, and bonding to an electrode current collector. For example, the binder is added in an amount of 1 to 50% by weight based on the total weight of the mixture containing the positive electrode active material. Since such a binder is the same as described above, a detailed description thereof will be omitted here. The binder may further include a conductive material. The conductive material may be mixed in advance with a binder or may be mixed with a positive electrode active material. Such a conductive material may be added, for example, in an amount of 1 to 50% by weight based on the total weight of the mixture including the positive electrode active material.

In addition, the negative electrode is manufactured by coating and drying negative electrode active material particles on a negative electrode current collector, and, if necessary, components such as a conductive material, a binder, and a solvent described above may be further included.

The negative electrode current collector may have a thickness of 3 to 500 μm. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

Examples of the negative electrode active material include carbon such as non-graphitized carbon and graphite carbon; metal complex oxide such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me':Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials.

The electrode composite of the present invention can be produced, for example, as follows.

First, an electrode composite layer is coated on one or both surfaces of an electrode current collector. The electrode current collector and the electrode composite layer are as described above with respect to the electrode composite structure.

A binder solution is generated by dissolving a binder for a desired electrode active material (such as a positive electrode active material or negative electrode active material) in a solvent, and then the desired electrode active material particles are added to the generated binder solution. In this mixture, the electrode active material particles are uniformly dispersed in a binder solution by a method such as stirring, to thereby prepare an active material slurry. The prepared active material slurry is applied in the form of a layer on one or both surfaces of the electrode current collector.

The active material slurry can be applied using a conventional coating method known in the art, for example, dip coating, die coating, roll coating, comma coating, or a mixture thereof. It can be performed continuously or discontinuously, using one of the above-mentioned various methods. Particularly, in terms of productivity, it is preferable that the coating is carried out continuously or simultaneously individually for several electrode current collectors.

The solvent is removed from the active material slurry applied on the electrode current collector. The solvent can be removed, for example through a drying process. The active material slurry applied on the electrode current collector is dried simultaneously or individually to remove the solvent to obtain an electrode assembly.

When the active material slurry is applied through coating, a solvent may be added to the coating solution. In this case, an additional drying process of the coating layer is required. Drying conditions may be batchwise or continuously using an oven or heated chamber in a temperature range in consideration of the vapor pressure of the solvent used.

In addition, the electrode composite of the present invention can be used as an electrode composite of an electrochemical device. Such an electrochemical device includes all devices that undergo an electrochemical reaction, and specific examples include all types of primary cells, secondary cells, fuel cells, solar cells, or capacitors such as supercapacitor devices. Particularly, among the secondary batteries, a lithium secondary battery including a lithium metal secondary battery, a lithium ion secondary battery, a lithium polymer secondary battery or a lithium ion polymer secondary battery is preferred.

An electrochemical device can be manufactured according to a conventional method well known in the art. For example, an electrode composite described above, that is, a positive electrode and a negative electrode may be assembled by interposing a conventional separator in the art, and then injected with an electrolyte, to thereby manufacture an electrochemical device.

The separator to be applied together with the electrode composite according to an embodiment of the present invention is not particularly limited, and may be prepared in a porous form bound to inorganic/organic particles or the like according to a conventional method known in the art.

In addition, heterogeneous electrodes or electrode composites manufactured according to the manufacturing method of the present invention, that is, positive electrode composites and negative electrode composites, respectively, are disposed so that their porous binder layers are opposed to each other, and a separator is interposed therebetween to be wound or laminated, to thereby manufacture an electrochemical device.

Specifically, it is possible to provide an electrochemical device including a positive electrode composite having a porous binder layer on one side, a negative electrode composite with a porous binder layer on one side, and a separator interposed between the porous binder layer of the positive electrode composite and the porous binder layer of the negative electrode composite. In another embodiment, the electrochemical device is characterized in that it is a lithium secondary battery.

In addition, the injection of the electrolyte may be performed at an appropriate step in the battery manufacturing process, depending on the manufacturing process and required physical properties of the final product. That is, it can be applied before battery assembly or at the final stage of battery assembly.

In addition, the electrochemical device of the present invention includes all devices that undergo an electrochemical reaction, and specific examples may be all types of primary cells, secondary cells, fuel cells, solar cells, or capacitors such as supercapacitor devices. Particularly, among the secondary batteries, a lithium secondary battery including a lithium metal secondary battery, a lithium ion secondary battery, a lithium polymer secondary battery or a lithium ion polymer secondary battery is preferred.

Hereinafter, the present invention will be described in more detail through examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

EXAMPLES AND COMPARATIVE EXAMPLES

Example 1

Powdered polyvinylidene fluoride (PVDF) homopolymer (KF-1100, KUREHA company, weight average molecular weight of 280,000 g/mol) was granulated into cylindrical pellets having an average diameter of 3 mm. The granulated PVDF was mixed in NMP (N-methyl-2-pyrrolidone) to an amount of 25% by weight, and then stirred at 25° C. for 2 hours using a stirrer (IK company R010).

FIG. 1 shows a result of observing the solution after the solution, in which the stirring process is completed, is filtered through a 200 mesh filter. Referring to FIG. 1, it can be seen that granulated PVDF dissolved in NMP, which is a solvent, passes through a filter and has little material filtered. Due to this, it can be seen that the granulated PVDF dissolves effectively while hardly generating floating matters.

Example 2

Powdered polyvinylidene fluoride (PVDF) homopolymer (KF-1100 and KF-7200 were mixed in a ratio of 1:1, KUREHA company) was granulated into cylindrical pellets having an average diameter of 3 mm. The granulated PVDF was mixed in NMP (N-methyl-2-pyrrolidone) to an amount of 20% by weight, and then stirred at 25° C. for 2 hours using a stirrer (IK company R010).

Example 3

Powdered polyvinylidene fluoride (PVDF) homopolymer (KF-1100, KUREHA company, weight average molecular weight of 280,000 g/mol) was granulated into cylindrical pellets having an average diameter of 2 mm. Further, powdered polyvinylidene fluoride (PVDF) homopolymer (KF-7200, KUREHA company, weight average molecular weight of 630,000 g/mol) was granulated into cylindrical pellets having an average diameter of 4 mm. Each granulated PVDF was mixed in NMP (N-methyl-2-pyrrolidone) at a mixing ratio of 1.5:1 to 20% by weight, and then stirred at 25° C. for 2 hours using a stirrer (IK company R010).

Comparative Example 1

After mixing powdered polyvinylidene fluoride (PVDF) homopolymer (KF-1100, KUREHA company, weight average molecular weight of 280,000 g/mol) in NMP (N-methyl-2-pyrrolidone) to 25% by weight, the mixture was stirred at 25° C. for 2 hours using a stirrer (IK company R010).

FIG. 2 shows a result of observing the solution after the solution, in which the stirring process is completed, is filtered through a 200 mesh filter. Referring to FIG. 2, it can be seen that PVDF in powder form dissolved in NMP, which is a solvent, passes through a filter and has a lot of materials filtered. Due to this, it can be seen that relatively many impurities remain in powdered PVDF even after stirring for the dissolution process. This is because many suspended matters are generated during dissolution, resulting in lower solubility.

Comparative Example 2

After mixing powdered polyvinylidene fluoride (PVDF) homopolymer (KF-7200, KUREHA company, weight average molecular weight of 630,000 g/mol) in NMP (N-methyl-2-pyrrolidone) to 20% by weight, the mixture was stirred at 25° C. for 2 hours using a stirrer (IK company R010).

Example 4: Preparation of Positive Electrode Composite

With respect to 100 parts by weight of the binder solution prepared according to Example 1, 450 parts by weight of lithium cobalt composite oxide as positive electrode active material particles and 25 parts by weight of carbon black as a conductive material were mixed to prepare a positive electrode active material slurry. The prepared positive electrode active material slurry was applied to the positive electrode current collector, dried, and roll-pressed to prepare a positive electrode composite. An aluminum (Al) thin film having a thickness of 20 μm was used as the positive electrode current collector.

FIG. 3 shows a result of observing the cross section of the positive electrode composite layer according to Example 4. Referring to FIG. 3, it can be seen that positive electrode active material particles having a shape close to a sphere are dispersed, and a structure in which a binder according to Example 1 and a conductive material are filled between positive electrode active material particles. As shown in FIG. 3, it was confirmed that the positive electrode active material particles were evenly dispersed in the layer, and the void portion filled with the binder and the conductive material had a relatively small void size.

In addition, FIG. 4 is a result of observing a cross section of the positive electrode composite layer according to Example 4 using Energy Dispersive Spectrometry (EDS). In FIG. 4, fluorine (F) was mapped in a cross section, and as a result, it was confirmed that the part of the PVDF binder filled between the positive electrode active material particles appeared in green.

Example 5: Preparation of Negative Electrode Composite

With respect to 100 parts by weight of the binder solution prepared according to Example 3, 95 parts by weight of carbon powder as negative electrode active material particles and 3 parts by weight of carbon black as a conductive material were mixed to prepare a negative electrode active material slurry. The prepared negative electrode active material slurry was applied to the negative electrode current collector, dried, and roll-pressed to prepare a negative electrode composite. A copper (Cu) thin film having a thickness of 90 μm was used as the negative electrode current collector.

Comparative Example 3: Preparation of Positive Electrode Composite

Using the binder solution prepared according to Comparative Example 1, a positive electrode composite was prepared in the same manner as in Example 4.

FIG. 5 is a result of observing the cross section of the positive electrode composite layer according to Comparative Example 3. Referring to FIG. 5, it can be seen that positive electrode active material particles having a shape close to a sphere are dispersed, and binders according to Comparative Example 1 are filled between the positive electrode active material particles. As shown in FIG. 5, the dispersion of positive electrode active material particles is not uniform, and the cases where the void portion filled with the binder is relatively large and small are mixed.

In addition, FIG. 6 shows a result of observing a cross section of the positive electrode composite layer according to Comparative Example 3 using Energy Dispersive Spectrometry (EDS). In FIG. 6, fluorine (F) was mapped in a cross section, and as a result, it was confirmed that the part of the PVDF binder filled between the positive electrode active material particles appeared in green.

Comparative Example 4: Preparation of Negative Electrode Composite

Using the binder solution prepared according to Comparative Example 2, a positive electrode composite was prepared in the same manner as in Example 5.

Experimental Example 1: Evaluation of Adhesion

Adhesion evaluation was performed on the electrode composites prepared in Example 4 and Comparative Example 3, respectively. In the evaluation of adhesive force, the adhesive force between the electrode current collector and the positive electrode composite layer in which the active material, the conductive material, and the binder were mixed was evaluated.

Specifically, the coating film of the electrode composite layer had an average thickness of 90 μm, and the specimen was prepared in a width of 2 cm and a length of 20 cm. The results are shown in Table 1.

TABLE 1

| Example No. | Adhesive force (N/m) |
| --- | --- |
| Example 4 | 120.1 |
| Comparative Example 3 | 85.8 |

Referring to Table 1, Example 4 exhibits an adhesive force of 120.1 N/m, and Comparative Example 3 exhibits an adhesive force of 85.8 N/m. That is, compared to Comparative Example 3, the electrode composite according to Example 4 exhibits an improved adhesive force by nearly 40%. Through this, it was confirmed that the adhesive force of the electrode binder can be remarkably increased through the process of granulating PVDF.

Experimental Example 2: Capacity Retention Evaluation

A battery was manufactured using the electrode composites prepared in Examples 4 and 5, respectively, and the electrode composites prepared in Comparative Examples 3 and 4, respectively.

Specifically, unit cells were assembled by placing a polyolefin-based separator between the positive electrode composite according to Example 4 and the negative electrode composite according to Example 5. Then, electrolyte (ethylene carbonate (EC)/propylene carbonate (PC)/diethyl carbonate (DEC)=3/2/5 (volume ratio) and lithium hexafluorophosphate (LiPF6) 1 M)) were injected to prepare a secondary battery (Example battery).

In addition, a secondary battery was manufactured by the same method using the positive electrode composite according to Comparative Example 3 and the negative electrode composite according to Comparative Example 4 (Comparative Example battery).

Each battery was charged and discharged, and the capacity retention rate according to the number of charge and discharge was evaluated. Specifically, the capacity at the first discharge was set to 100%, and the change in capacity according to the charge/discharge cycle was evaluated relatively. The conditions of the specimen are the same as in Experimental Example 1. The evaluation results are shown in Table 2, and after repeating the charge/discharge cycle for each number of times, the capacity retention rate was evaluated relatively.

TABLE 2

| Number of cycles (times) | Capacity retention rate at Example battery (%) | Capacity retention rate at Comparative Example battery (%) |
| --- | --- | --- |
| 0 | 100 | 100 |
| 100 | 96.1 | 95.7 |
| 200 | 94.1 | 93.4 |
| 300 | 92.8 | 91.7 |
| 400 | 91.2 | 89.5 |

Referring to Table 2, in the example battery, after repeating charging and discharging 100 times, the capacity retention rate was 96.1% compared to the initial stage, and after repeating charging and discharging 400 times, the capacity retention rate was 91.2% compared to the initial stage. On the other hand, in the comparative example battery, after repeating charging and discharging 100 times, the capacity retention rate was 95.7% compared to the initial stage, and after repeating charging and discharging 400 times, the capacity retention rate of 89.5% compared to the initial stage was maintained. That is, in the example battery, the capacity of 90% or more was maintained even after repeating charging and discharging 400 times, but in the comparative example battery, it was seen that the capacity dropped to less than 90% under the same conditions.

What is claimed is:

1. A method for manufacturing an electrode binder, comprising: dissolving granulated polyvinylidene fluoride (PVDF) in a solvent,
    wherein the granulated polyvinylidene fluoride (PVDF) is in a form of granulated powdery particles,
    an average diameter of the granulated powdery particles is in a range between 2 and 3 mm, and
    the solvent comprises N-methyl-2-pyrrolidone (NMP)
    a content of the granulated polyvinylidene fluoride (PVDF) dissolved in a solvent is in a range between 20 and 25% (w/w) with respect to a total weight of the solvent including the granulated polyvinylidene fluoride (PVDF).

2. The method of claim 1, wherein a ratio of lengths of a long axis to a short axis of the granulated powdery particles is in a range between 20:1 and 1:1.

3. The method of claim 1, wherein the granulated powdery particles include: at least one of first powder particles having a weight average molecular weight (Mw) of $2.0 \times 10^5$ to $7.5 \times 10^5$; or second powder particles having a weight average molecular weight (Mw) of $7.5 \times 10^6$ to $2.5 \times 10^6$.

4. The method of claim 1, wherein the solvent comprises a water-soluble solvent having a polar group.

5. The method of claim 1, further comprising: adding a conductive material after the dissolving granulated polyvinylidene fluoride (PVDF) in the solvent.

6. The method of claim 1, wherein a ratio of lengths of a long axis to a short axis of the granulated powdery particles is in a range between 17:1 to 3:1.

7. The method of claim 1, wherein a ratio of lengths of a long axis to a short axis of the granulated powdery particles is in a range between 15:1 to 5:1.

8. The method of claim 1, wherein a ratio of lengths of a long axis to a short axis of the granulated powdery particles is in a range between 13:1 to 7:1.

9. The method of claim 1, wherein the granulated powdery particles has a weight average molecular weight (Mw) of $2.5 \times 10^5$ to $7.5 \times 10^5$.

10. The method of claim 1, wherein the granulated powdery particles has a weight average molecular weight (Mw) of $3.0 \times 10^5$ to $6.5 \times 10^5$.

11. The method of claim 1, wherein the granulated powdery particles has a weight average molecular weight (Mw) of $3.5 \times 10^5$ to $6.0 \times 10^5$.

12. The method of claim 1, wherein the granulated powdery particles include:
    first powder particles having a weight average molecular weight (Mw) of $2.0 \times 10^5$ to $7.5 \times 10^5$; and
    second powder particles having a weight average molecular weight (Mw) of $1.0 \times 10^6$ to $2.2 \times 10^6$.

13. The method of claim 1, wherein the granulated powdery particles include:
    first powder particles having a weight average molecular weight (Mw) of $2.5 \times 10^5$ to $7.5 \times 10^5$; and
    second powder particles having a weight average molecular weight (Mw) of $1.2 \times 10^6$ to $2.0 \times 10^6$.

14. The method of claim 1, wherein the granulated powdery particles include:
    first powder particles having a weight average molecular weight (Mw) of $3.0 \times 10^5$ to $6.5 \times 10^5$; and
    second powder particles having a weight average molecular weight (Mw) of $1.4 \times 10^6$ to $1.8 \times 10^6$.

* * * * *